(12) United States Patent
Dellacha

(10) Patent No.: US 7,357,396 B2
(45) Date of Patent: Apr. 15, 2008

(54) AUTOMOTIVE SUSPENSION WITH SPRING-SHOCK ABSORBER ASSEMBLY RESPONSE CONTROL

(75) Inventor: Paolo Dellacha, Modena (IT)

(73) Assignee: Ferrari S.p.A., Modena (IT)

( * ) Notice: Subject to any disclaimer, the term of this patent is extended or adjusted under 35 U.S.C. 154(b) by 0 days.

(21) Appl. No.: 11/592,751

(22) Filed: Nov. 3, 2006

(65) Prior Publication Data
US 2007/0114732 A1 May 24, 2007

Related U.S. Application Data

(63) Continuation-in-part of application No. PCT/EP2005/052002, filed on May 2, 2005.

(30) Foreign Application Priority Data
May 3, 2004 (IT) .......................... BO2004A0278

(51) Int. Cl.
*B60G 7/00* (2006.01)
(52) U.S. Cl. .................................................. 280/5.52
(58) Field of Classification Search ................ 280/5.52, 280/124.152, 124.153, 124.154, 124.164, 280/124.125
See application file for complete search history.

(56) References Cited

U.S. PATENT DOCUMENTS 4,881,752 A 11/1989 Tanaka et al.
5,431,429 A 7/1995 Lee et al.
6,082,748 A 7/2000 Hartmann et al.

FOREIGN PATENT DOCUMENTS

| DE | 43 17 510 A1 | 12/1993 |
| DE | 199 23 343 A1 | 11/2000 |
| JP | 03 099916 A | 7/1991 |
| JP | 03 231010 A | 1/1992 |

OTHER PUBLICATIONS

International Search Report for PCT/EP2005/052002 dated Sep. 2, 2005.

*Primary Examiner*—Faye M. Fleming
(74) *Attorney, Agent, or Firm*—Marcus S. Simon; Graybeal Jackson Haley

(57) ABSTRACT

In an automotive suspension, a supporting member supporting a wheel hub is connected mechanically to a frame of a car to move in a vertical direction with respect to the frame; movement of the supporting member in the vertical direction is opposed by a spring-shock absorber assembly connected mechanically on one side to the frame of the car, and on the other side to the supporting member by means of a coupling device of variable geometry, which is controlled selectively by an actuator for varying the geometry of the coupling device in such a manner as to vary a suspension ratio between vertical movement of the supporting member and a corresponding variation in length of the spring-shock absorber assembly.

8 Claims, 2 Drawing Sheets

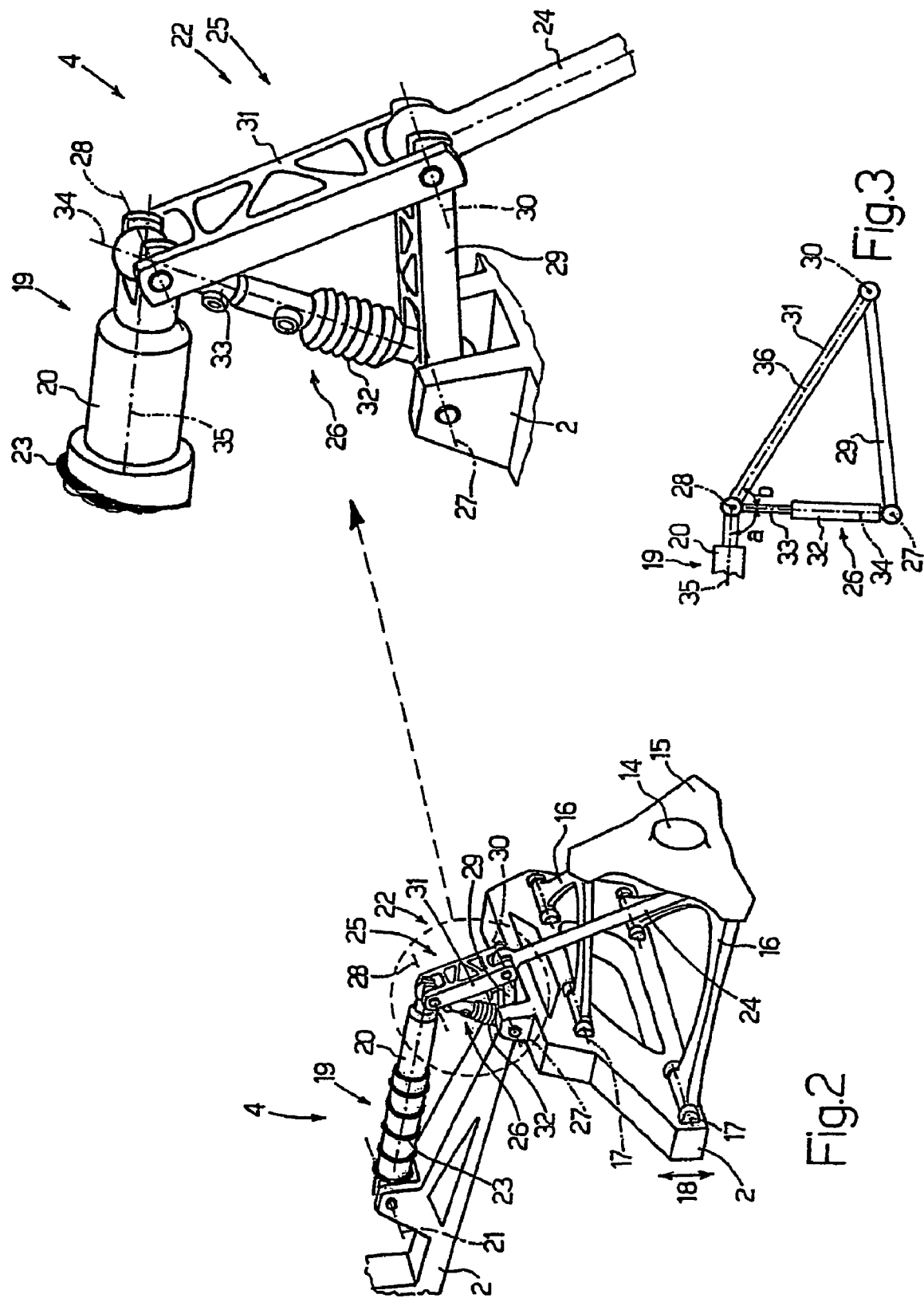

AUTOMOTIVE SUSPENSION WITH SPRING-SHOCK ABSORBER ASSEMBLY RESPONSE CONTROL

PRIORITY CLAIM

This is a continuation-in-part application which claims priority from PCT/EP2005/052002, published in English, filed May 2, 2005, which claims priority from Italian patent Application No. BO2004 A 000278, filed May 3, 2004, which are incorporated herein by reference.

TECHNICAL FIELD

The present invention relates to an automotive suspension.

BACKGROUND

High-performance sports cars currently feature four independent suspensions, which are normally of the "four-link" type for compactness and good road performance.

A four-link suspension connects a wheel hub to the car frame, and comprises a wheel hub supporting member connected mechanically to the car frame to move substantially vertically with respect to the frame.

Vertical movement of the supporting member is opposed by a spring-shock absorber assembly fixed on one side to the car frame, and connected mechanically on the other side to the supporting member by connecting means of given geometry.

The geometry of the connecting means determines a suspension ratio, which defines the ratio between vertical movement of the supporting member and a corresponding variation in the length of the spring-shock absorber assembly, and is either constant or variable along the travel of the spring-shock absorber assembly, depending on the geometry of the connecting means.

The response characteristics of the spring-shock absorber assembly are normally constant, and constitute a trade-off between optimum dynamic performance of the car and an adequate degree of passenger comfort.

In an attempt to adapt response of the spring-shock absorber assembly to current driving conditions, electronically controlled shock absorbers have been proposed to vary damping performance of the shock absorbers, and which provide for reduced damping in racing or extreme conditions (e.g. as when braking sharply) and increased damping in normal on-road driving conditions.

Suspension performance adjustment using electronically controlled shock absorbers, however, is limited, on account of failure to make any adjustment whatsoever in response of the springs. It has therefore been proposed to employ air springs, as opposed to conventional mechanical steel springs. By adjusting the internal pressure of an air spring, it is possible to adjust both the preload of the spring, and hence the height of the car, and the stiffness of the air spring.

Air springs, however, have several drawbacks as compared with conventional mechanical steel springs: they are more expensive, bulky, and less dependable, have a shorter working life, and, above all, are functionally inferior in a manner preventing use in high-performance sports cars. Moreover, the stiffness adjustment achieved by adjusting the internal pressure of an air spring is fairly limited, and depends anyway on the adjustment in height of the car.

DE19923343A1 disclose a vehicle with sprung wheels and with deflection between wheel stroke and damping or spring member stroke. The vehicle has wheels supported on at least one damping or spring member, which is held at one end in such a manner that the spacing between the bodywork and the wheel axle can be varied for different load conditions; there is a deflection between the wheel stroke and the stroke of the damping or spring member.

SUMMARY

It is an object of the present invention to provide an automotive suspension, which is cheap and easy to produce and, at the same time, eliminates the aforementioned drawbacks.

According to the present invention, there is provided an automotive suspension as claimed in the accompanying claims.

BRIEF DESCRIPTION OF THE DRAWINGS

A non-limiting embodiment of the present invention will be described by way of example with reference to the accompanying drawings.

FIG. 2 shows a schematic view in perspective, with parts enlarged for clarity, of a suspension in accordance with the present invention.

FIG. 3 shows a schematic side view, with parts removed for clarity, of the FIG. 1 suspension.

DETAILED DESCRIPTION

Figure 1:
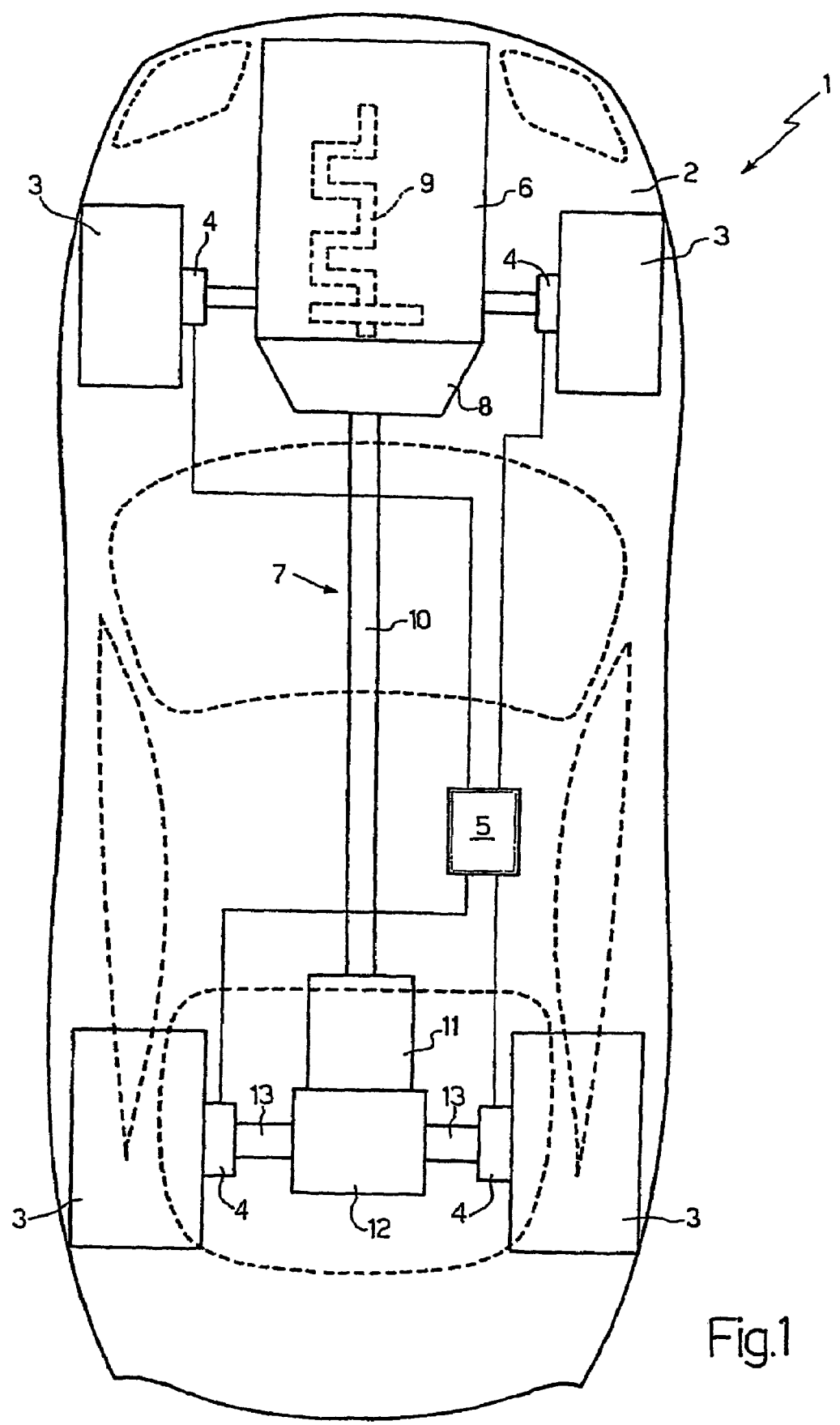
FIG. 1 shows a schematic plan view of a car featuring suspensions in accordance with the present invention.

Number 1 in FIG. 1 indicates as a whole a car comprising a supporting frame 2, to which four wheels 3 are connected with the interposition of respective suspensions 4 controlled selectively and independently by an electronic central control unit 5 in response to signals from a number of sensors (not shown) for determining the driving conditions of car 1.

Car 1 comprises a front longitudinal internal combustion engine 6 connected to the rear drive wheels 3 by a power train 7, in turn comprising a dry or oil-bath clutch 8, which is housed in a casing integral with engine 6 and connects an output shaft 9 of engine 6 to a propeller shaft 10.

Shaft 10 is connected to a mechanical gearbox 11 located at the rear and connected to a differential 12, which rotates two axle shafts 13 projecting from differential 12, and each for rotating a respective rear drive wheel 3.

As shown in FIG. 2, each suspension 4 is a so-called "four-link" type, connects a wheel hub 14 to frame 2, and comprises a supporting member 15 for supporting wheel hub 14, which is fitted to supporting member 15 to rotate about a respective central axis.

Supporting member 15 is connected to frame 2 by two cranks 16, each of which is hinged to frame 2 to oscillate, with respect to frame 2, about a substantially horizontal hinge axis 17 parallel to axis 17 of the other crank 16, and is connected in known manner to supporting member 15 to permit linear movements of supporting member 15 in a substantially vertical direction 18.

Suspension 4 also comprises a known spring-shock absorber assembly 19, in turn comprising a shock absorber 20. Shock absorber 20 is hinged at a first end to frame 2 to oscillate, with respect to frame 2, about a hinge axis 21 substantially parallel to axes 17; is connected at a second end to supporting member 15 by a coupling device 22 described in detail later on; and is wound with a spring 23.

Coupling device 22 comprises a push-rod 24 connected in known manner at a first end to supporting member 15; and a variable-geometry crank mechanism 25 interposed between shock absorber 20 and a second end of push-rod 24.

Crank mechanism 25 comprises a first crank 26 extending between two axes 27 and 28, of which axis 27 is the axis of rotation of crank 26 with respect to frame 2, and axis 28 the axis of rotation of crank 26 with respect to shock absorber 20; a second crank 29 extending between axis 27 and an axis 30 of rotation of crank 29 with respect to push-rod 24; and a connecting rod 31 extending between axes 28 and 30.

Crank 26 is of variable length, as defined by an actuating cylinder 32, which has an output rod 33 movable between a withdrawn position and at least one extracted position, and a longitudinal axis 34 forming an angle a of close to 90° with a longitudinal axis 35 of shock absorber 20, and an angle b of at least 60° with a longitudinal axis 36 of connecting rod 31 (FIG. 3).

Operation of cylinder 32 varies the geometry of crank mechanism 25 and therefore a suspension ratio defined by the ratio between displacement of supporting member 15 in direction 18, and a corresponding variation in the length of spring-shock absorber assembly 19.

In connection with the above, it should be pointed out that the vertical stiffness of suspension 4 is proportional to the relative suspension ratio, and that the suspension ratio and, hence, the vertical stiffness of suspension 4 increase as rod 33 moves from the withdrawn to the extracted position, and, conversely, decrease as rod 33 moves from the extracted to the withdrawn position.

It is important to stress that a variation in the suspension ratio of each suspension 4 also affects damping by shock absorber 20 coaxial with spring 23. This effect is to be considered positive, however, in that, generally speaking, a demand for greater stiffness is consistent with increased damping performance by the system. In some cases, in fact (high-performance sports cars), the effect may be so positive as not to warrant the use of active or semi-active shock absorbers. Using variable-damping shock absorbers would anyway reintroduce a degree of freedom in varying damping performance independently of stiffness; in which case, optimizing suspension performance would mean integrating the control systems of the two active systems.

Shock absorber 20 of each suspension 4 can be separated anyway from spring 23 to make performance of shock absorber 20 independent of variations in vertical stiffness.

When car 1 is running, electronic central control unit 5 determines the driving conditions of car 1 on the basis of the values detected by said sensors (not shown) and on the basis of known evaluation and prediction algorithms; and, on the basis of the driving conditions (normally current and predicted) of car 1, electronic central control unit 5 varies the suspension ratio, i.e. vertical stiffness, of the four suspensions 4 to optimize dynamic performance of car 1.

The ability to vary the vertical stiffness of suspensions 4 independently as a function of the driving conditions of the car (lateral and longitudinal acceleration, yaw speed, roll and pitch angles, etc.) enables central control unit 5 to control actuating cylinders 32 of suspensions 4 to prevent rolling (when cornering) and/or pitching (when accelerating or braking).

For example, pitching of car 1 typically associated with acceleration of car 1 may be greatly reduced by increasing the stiffness of suspensions 4 of rear wheels 3; pitching of car I typically associated with braking of car 1 may be greatly reduced by increasing the stiffness of suspensions 4 of front wheels 3; and rolling of car 1 typically associated with cornering may be greatly reduced by increasing the stiffness of suspensions 4 of left wheels 3 when turning left, and of right wheels 3 when turning right.

Car 1, therefore, need not be equipped with a roll bar or other mechanical anti-roll members, the function of which being effectively performed by dynamically controlling the vertical stiffness of suspensions 4.

In a first embodiment, electronic central control unit 5 controls actuating cylinder 32 of each suspension 4 at a control frequency of around 6 Hz, which is the maximum main frequency of typical body movements of car 1.

In a further embodiment, electronic central control unit 5 controls actuating cylinder 32 of each suspension 4 at a control frequency of around 30 Hz, which provides for also controlling unsprung weight movements, with various advantages in terms of overall comfort.

It should be pointed out that, unlike other known body control systems, electronic central control unit 5 works on the vertical stiffness, as opposed to the height, of suspensions 4, with obvious advantages in terms of efficiency and effectiveness.

By integrating suspensions 4 vertical stiffness-controlled by central control unit 5, car 1 offers numerous advantages: a shift in trade-off towards easier handling (car 1 is easier to handle at low speed and on straight road; improved roll control when cornering and pitch control when accelerating or braking; roll stiffness (front/rear, left/right) adjustment to effect under-/oversteering performance (understeering curve and attitude curve); improved drive by altering pitch stiffness (front/rear) distribution; elimination of rear stiffness effect caused by the roll bar over uneven road; improved braking by altering pitch stiffness (front/rear) distribution; enhanced steady aerodynamic performance by improving control of the off-road height of car 1, and by limiting vertical and pitch movements at high speed by increasing front and rear stiffness; and enhanced non-steady aerodynamic performance by improving stability by partly recovering losses in overall stiffness.

From the foregoing it will be appreciated that, although specific embodiments of the invention have been described herein for purposes of illustration, various modifications may be made without deviating from the spirit and scope of the invention.

The invention claimed is:

1. An automotive suspension for connecting a wheel hub to a frame of a car; the suspension comprising:
   a supporting member for supporting the wheel hub;
   first coupling means for mechanically connecting the supporting member to said frame to permit movement of the supporting member with respect to the frame in a substantially vertical direction;
   a spring-shock absorber assembly fixed to said frame;
   second coupling means comprising a crank mechanism of variable geometry for mechanically connecting the spring-shock absorber assembly to the supporting member to oppose movement of the supporting member with respect to said frame in said direction; and
   actuating means to selectively control the geometry of the crank mechanism of the second coupling means to vary a suspension ratio between vertical movement of the supporting member and a corresponding variation in length of the spring-shock absorber assembly;
   wherein the crank mechanism comprises a first crank extending between a first axes of rotation of the crank mechanism with respect to the frame and a second axes of rotation of the crank mechanism with respect to the spring-shock absorber assembly, a second crank extending between the first axes of rotation and a third axes of rotation, and a connecting rod extending between the second axes of rotation and the third axes of rotation;

wherein the actuating means comprise at least one actuating cylinder defining the first crank; and wherein the first crank and the spring-shock absorber assembly have respective longitudinal axes forming an angle close to 90°.

2. An automotive suspension as claimed in claim 1, wherein said second coupling means comprise a rod, which is interposed between the crank mechanism and the supporting member and rotates about the third axes of rotation.

3. An automotive suspension as claimed in claim 1, wherein the first crank and the connecting rod have respective longitudinal axes forming a further angle of at least 60°.

4. A car comprising a frame supporting four wheel hubs with the interposition of four respective suspensions, each of which is as claimed in claim 1; the car comprising a number of sensors for determining the driving conditions of the car, and an electronic central control unit connected to the sensors and for controlling the actuating means of each suspension in response to signals from said sensors.

5. A car as claimed in claim 4, wherein the actuating means of each suspension are controlled at a control frequency of around 6 Hz.

6. A car as claimed in claim 4, wherein the actuating means of each suspension are controlled at a control frequency of around 30 Hz.

7. A car as claimed in claim 4, wherein the electronic central control unit controls the actuating means of each suspension to perform an anti-roll function.

8. A car as claimed in claim 4, wherein the electronic central control unit controls the actuating means of each suspension to perform an anti-pitch function.

* * * * *